United States Patent
Nakatani et al.

(10) Patent No.: US 10,532,529 B2
(45) Date of Patent: Jan. 14, 2020

(54) APPARATUS AND METHOD OF ADHERING BELT-SHAPED TIRE MEMBER

(71) Applicant: TOYO TIRE & RUBBER CO., LTD., Osaka-shi, Osaka (JP)

(72) Inventors: Katsuhiro Nakatani, Osaka (JP); Tomoyuki Kobayashi, Osaka (JP); Yasuhisa Masuda, Osaka (JP); Makoto Komo, Osaka (JP); Taizo Yamamoto, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 307 days.

(21) Appl. No.: 15/438,257

(22) Filed: Feb. 21, 2017

(65) Prior Publication Data
US 2017/0157872 A1 Jun. 8, 2017

Related U.S. Application Data

(62) Division of application No. 14/301,819, filed on Jun. 11, 2014, now Pat. No. 10,350,847.

(30) Foreign Application Priority Data

Jun. 26, 2013 (JP) ................. 2013-134136

(51) Int. Cl.
*B29D 30/28* (2006.01)
*B29D 30/30* (2006.01)
(Continued)

(52) U.S. Cl.
CPC ............. *B29D 30/28* (2013.01); *B29D 30/30* (2013.01); *B29D 30/3007* (2013.01);
(Continued)

(58) Field of Classification Search
CPC .... B29D 30/28; B29D 30/30; B29D 30/3007; B29D 30/70; B29D 2030/4481; B29D 2030/4493
(Continued)

(56) References Cited

U.S. PATENT DOCUMENTS 2,473,067 A 6/1949 Edwin
4,474,338 A * 10/1984 Hirano ............... B29D 30/3007
156/123

(Continued)

FOREIGN PATENT DOCUMENTS

DE 2334887 A1 1/1975
GB 450111 A 7/1936
(Continued)

OTHER PUBLICATIONS

Office Action dated Jun. 24, 2014, issued in corresponding Japanese Patent Application No. 2013-134136, with Partial English translation (5 pages).
(Continued)

*Primary Examiner* — Jacob T Minskey
*Assistant Examiner* — Cedrick S Williams
(74) *Attorney, Agent, or Firm* — Westerman, Hattori, Daniels & Adrian, LLP

(57) ABSTRACT

There is provided an apparatus configured to adhere a belt-shaped tire member onto a mold drum including: a feeding device including the belt-shaped tire member arranged so as to be capable of being fed and a transferring and adhering device configured to transfer the belt-shaped tire member from the feeding device side to the mold drum side and adhere the belt-shaped tire member onto the mold drum, wherein the transferring and adhering device includes: a transferring device configured to circulate between the feeding device side and the mold drum side and
(Continued)

transfer the belt-shaped tire member sucked on the feeding device side to the mold drum side; and a separating unit configured to separate the transferred belt-shaped tire member on the mold drum side from the transferring device and adhere the belt-shaped tire member onto the mold drum.

4 Claims, 7 Drawing Sheets

(51) Int. Cl.
*B29D 30/70* (2006.01)
*B29D 30/44* (2006.01)

(52) U.S. Cl.
CPC ...... *B29D 30/70* (2013.01); *B29D 2030/4481* (2013.01); *B29D 2030/4493* (2013.01)

(58) Field of Classification Search
USPC .................................................. 156/110.1
See application file for complete search history.

(56) References Cited

U.S. PATENT DOCUMENTS

| | | | |
|---|---|---|---|
| 4,769,104 A | 9/1988 | Okuyama et al. | |
| 4,892,609 A | 1/1990 | Nakanome et al. | |
| 4,913,018 A * | 4/1990 | Bailey ................ | B29D 30/3007 83/155 |
| 5,476,035 A | 12/1995 | Florindez | |
| 2009/0188606 A1 | 7/2009 | Takatsuka et al. | |
| 2012/0248651 A1 | 10/2012 | Conti et al. | |

FOREIGN PATENT DOCUMENTS

| | | |
|---|---|---|
| JP | 59187836 A | 10/1984 |
| JP | 61-123529 A | 6/1986 |
| JP | 61-237626 A | 10/1986 |
| JP | 62-011634 A | 1/1987 |
| JP | 63-001531 A | 1/1988 |
| JP | 63-231927 A | 9/1988 |
| JP | 231730 U | 2/1990 |
| JP | H07-100354 B2 | 11/1995 |
| JP | 2001-9928 | 1/2001 |
| JP | 2001-79954 A | 3/2001 |
| JP | 4499803 B2 | 7/2010 |
| JP | 2010-253682 A | 11/2010 |

OTHER PUBLICATIONS

Office Action dated Feb. 3, 2015, issued in corresponding Japanese Patent Applicaion No. 2013-134136, with Partial English translation (3 pages).
Extended European Search Report dated Aug. 10, 2015., issued in counterpart EP Patent Application No. 14001924.1. (6 pages).
Office Action dated Feb. 3, 2016, issued in counterpart Chinese Patent Application No. 201410253816.5, with English translation. (13 pages).
Machine generated English language translation of JP2001-009928 (original document dated Jan. 2001).
English language Abstract for JP 59-187836 (original document dated Oct. 1984).
Notice of Allowance dated Mar. 13, 2019, issued in U.S. Appl. No. 14/301,819 (9 pages).

* cited by examiner

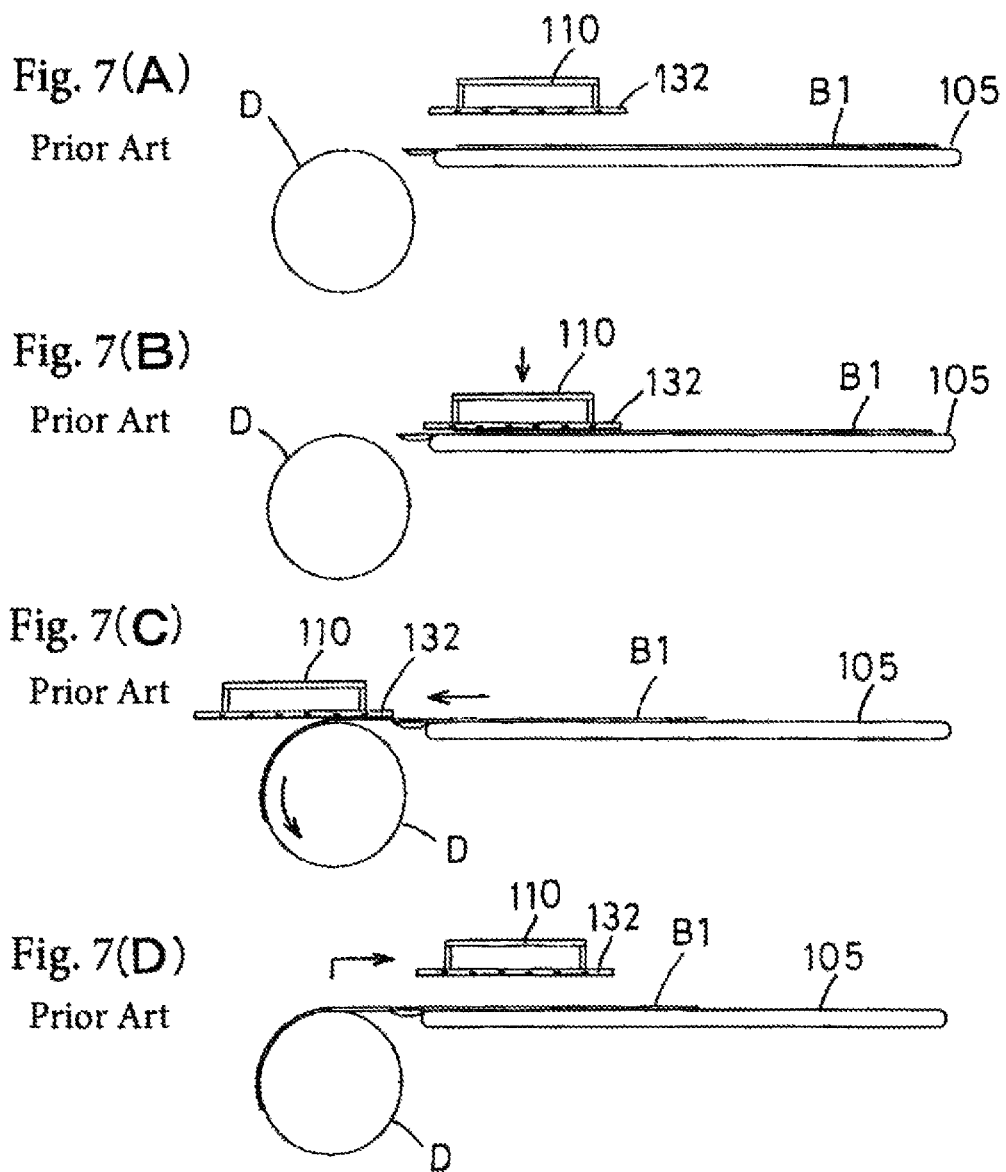

APPARATUS AND METHOD OF ADHERING BELT-SHAPED TIRE MEMBER

CROSS-REFERENCE TO RELATED APPLICATION

This application is a divisional of application Ser. No. 14/301,819, filed on Jun. 11, 2014, which is based upon and claims the benefit of priority of the prior Japanese Patent Application No. 2013-134136, filed on Jun. 26, 2013, the entire contents of which are incorporated herein by reference.

BACKGROUND OF THE INVENTION

Field of the Invention

The present invention relates to an apparatus and a method of adhering a belt-shaped tire member to a mold drum.

Background Art

In a process of manufacturing an air tire, a method disclosed in Japanese Patent No. 4,499,803 is proposed as a method of transferring and adhering a belt material to be used for a belt layer from a supply conveyor to a mold drum. In this method, a belt material B1 is placed on a supply conveyor 105 first, and a hand unit 110 waits at a position above the belt material B1 (FIG. 7A). Subsequently, the belt material B1 is held on a lower surface of a pressing plate 132 of the hand unit 110 moving downward from above in a state of being placed on the supply conveyor 105 (FIG. 7B). Subsequently, the supply conveyor 105 rotates and the pressing plate 132 advances in the direction of a mold drum D, whereby the belt material B1 in a state of being sandwiched between the supply conveyor 105 and the pressing plate 132 is fed toward the mold drum D (FIG. 7C). At this time, the mold drum D also rotates. Subsequently, the belt material B1 fed to a position above the mold drum D while being held by the advancing pressing plate 132 is adhered as-is to the rotating mold drum D by the advancing pressing plate 132. When a distal end of the belt material B1 is adhered to the mold drum D by actions described above, the supply conveyor 105, the pressing plate 132, and the mold drum D are stopped. The hand unit 110 then returns to the position above the supply conveyor 105 (FIG. 7D). These actions are repeated until a rear end of the belt material B1 is adhered to the mold drum D.

In the method described above, transferring and adhering actions of the belt material B1 to the mold drum D are stopped while the pressing plate 132 having the belt material B1 adhered thereto returns from a position on the mold drum D to a position above the supply conveyor 105. Therefore, waste of time results. In addition, since a tension applied to the belt material B1 can hardly be maintained uniformly when re-holding the belt material B1, a non-uniform tension arises in the belt material B1 adhered to the mold drum D. This non-uniformity arises in the circumferential direction of the drum at positions corresponding to the number of times of the repetition of the above-described actions, so that degradation of uniformity of the tires as products results.

As a transferring method with reduced waste of time, utilization of an apparatus disclosed in JP-A-2001-079954 is conceivable. This apparatus includes a magnet fixed to the circulating conveyor except for a portion near a supporting shaft on the inner peripheral side. In this apparatus, a belt-shaped material is transferred from one end side to the other end side in association with the circulation of the conveyor without stopping in the midcourse in a state of being stuck to an outer peripheral surface of the conveyor by a magnetic force of the magnet.

However, in this method, since the magnet does not exist at the portion near the supporting shaft on the inner peripheral side of the conveyor, when the distal end of the belt material B1 comes to the position near the supporting shaft of the conveyor, the distal end cannot be held properly and may jump up toward the outer periphery of the conveyor. When the magnetism of the magnet is increased, the conveyor is pressed by the belt-shaped material and the magnet, which are attracting strongly each other. Therefore, a large torque is required for circulating the conveyor and, in addition, the conveyor cannot be circulated smoothly.

SUMMARY OF THE INVENTION

It is an object of the invention to provide an apparatus and a method of transferring and adhering a belt-shaped tire member such as a belt material to a mold drum without wasting time. It is another object of the invention to provide an apparatus and method of adhering the belt-shaped tire member which can finally improve uniformity of tires as products.

The invention provides a belt-shaped tire member adhering apparatus configured to adhere a belt-shaped tire member onto a mold drum including: a feeding device arranged at a position opposing the mold drum so as to feed the belt-shaped tire member; and a transferring and adhering device configured to transfer the belt-shaped tire member from the feeding device side to the mold drum side and adhere the belt-shaped tire member onto the mold drum, wherein the transferring and adhering device includes a transferring device configured to circulate between the mold drum side and the feeding device side in accordance with a feeding action of the feeding device, and transfer the belt-shaped tire member stuck on the feeding device side to the mold drum side; and a separating unit configured to separate the transferred belt-shaped tire member from the transferring device and adhere the belt-shaped tire member onto the mold drum.

According to the invention, an apparatus and a method of transferring and adhering a belt-shaped tire member such as a belt material to a mold drum without waste of time are provided. In addition, the uniformity of the tires as products can finally be improved.

BRIEF DESCRIPTION OF THE DRAWINGS

FIGS. 7A to 7D are schematic drawings illustrating an adhering method of the related art.

DETAILED DESCRIPTION OF THE INVENTION

An embodiment of the invention will be described with reference to the drawings. Here, an apparatus and a method of transferring and adhering a belt material will be described as an example of a belt-shaped tire member. In the following description, the term "front" corresponds to the direction of a mold drum D in a state in which the mold drum D and a supply conveyor 5 are arranged in the direction orthogonal to an axis of rotation of the mold drum D. The term "rear" corresponds to the direction of supply conveyor 5. The term "left and right" is an expression when viewing a line along which the mold drum D and the supply conveyor 5 are arranged from the mold drum D side.

(1) Configuration of Belt Material Adhering Apparatus

An apparatus of the embodiment is an apparatus configured to adhere a belt material B1 to a peripheral surface of the mold drum D in a belt molding process in manufacture of tires, specifically, a molding process for molding only a belt layer into a cylindrical shape separately from molding of a carcass layer.

Figure 1:
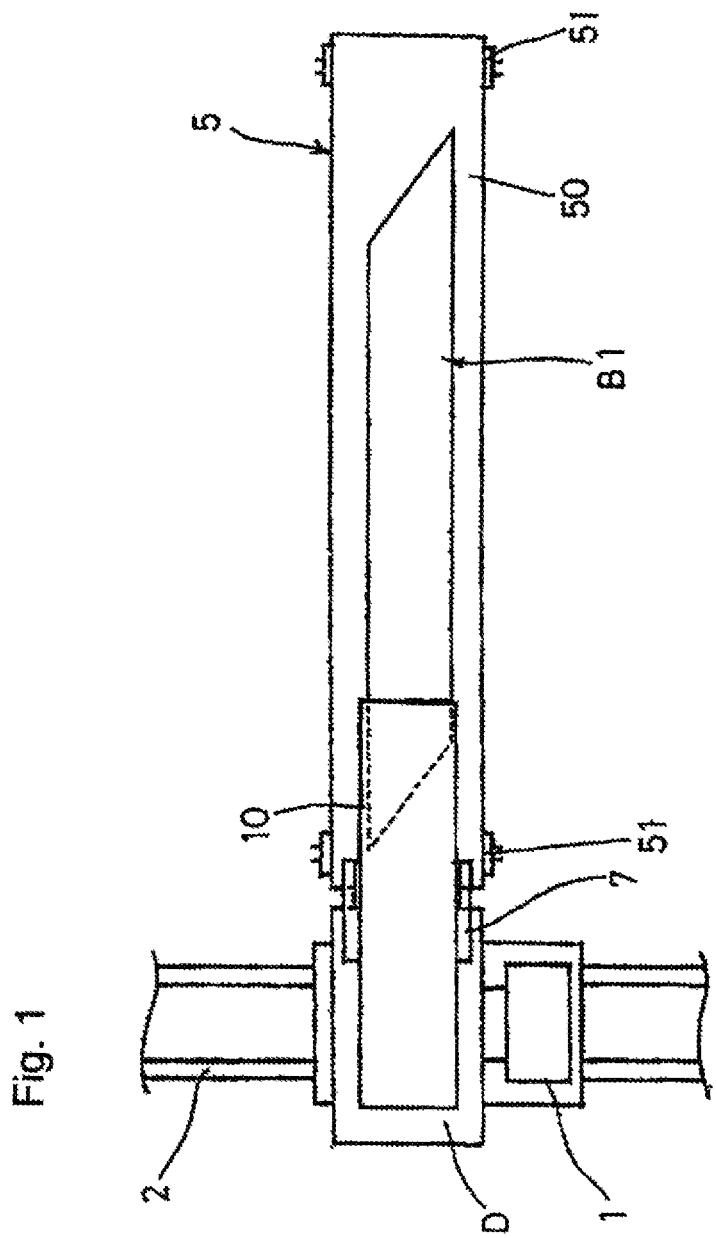
FIG. 1 is a plan view schematically illustrating an adhering apparatus of an embodiment.

As illustrated in FIG. 1, the belt material adhering apparatus of the embodiment includes the supply conveyor 5 as a feeding device arranged in a direction orthogonal to the axis of rotation of the mold drum D, and a transferring and adhering device 10 arranged above the mold drum D and the supply conveyor 5.

The mold drum D is configured to adhere the belt material B1 to the peripheral surface thereof to mold the cylindrical belt layer. The mold drum D is rotatably supported on a moving supporting bed 1 which moves on a track 2. The mold drum D is provided with a magnet, whereby a magnetic field is generated on a peripheral surface of the mold drum D. Therefore, the belt material B1 with steel cords described next is adhered to the peripheral surface thereof.

The belt material B1 is embedded into a rubber material in which a number of steel cords are arranged in parallel in a rubber material. The belt material is cut into a predetermined length so that a distal end and a rear end extend in parallel to each other and obliquely with respect to the longitudinal direction thereof. The steel cords are embedded in parallel in the distal end and the rear end. The length of the belt material B1 is a length corresponding to the length of a circumference of a tire.

The supply conveyor 5 is provided with a pulley 51 rotating by a drive unit such as a motor, which is not illustrated, and an endless conveyor belt 50 configured to circulate in association with the rotation of the pulley 51. The belt material B1 can be placed on an upper surface of the conveyor belt 50. The belt material B1 on the conveyor belt 50 is fed toward the mold drum D by the conveyor belt 50 being circulated. The supply conveyor 5 is height-adjustable, and is adjusted in height so that an upper surface of the conveyor belt 50 is substantially flush with an uppermost surface of a peripheral surface of the mold drum D at least at the time of feeding the belt material B1. The positional adjustment of the fore-and-aft direction is possible in accordance with the diameter of the mold drum D. A scraper 7 is provided at an end of the supply conveyor 5 on the feeding side.

(2) Configuration of Transferring and Adhering Apparatus

Figure 2:
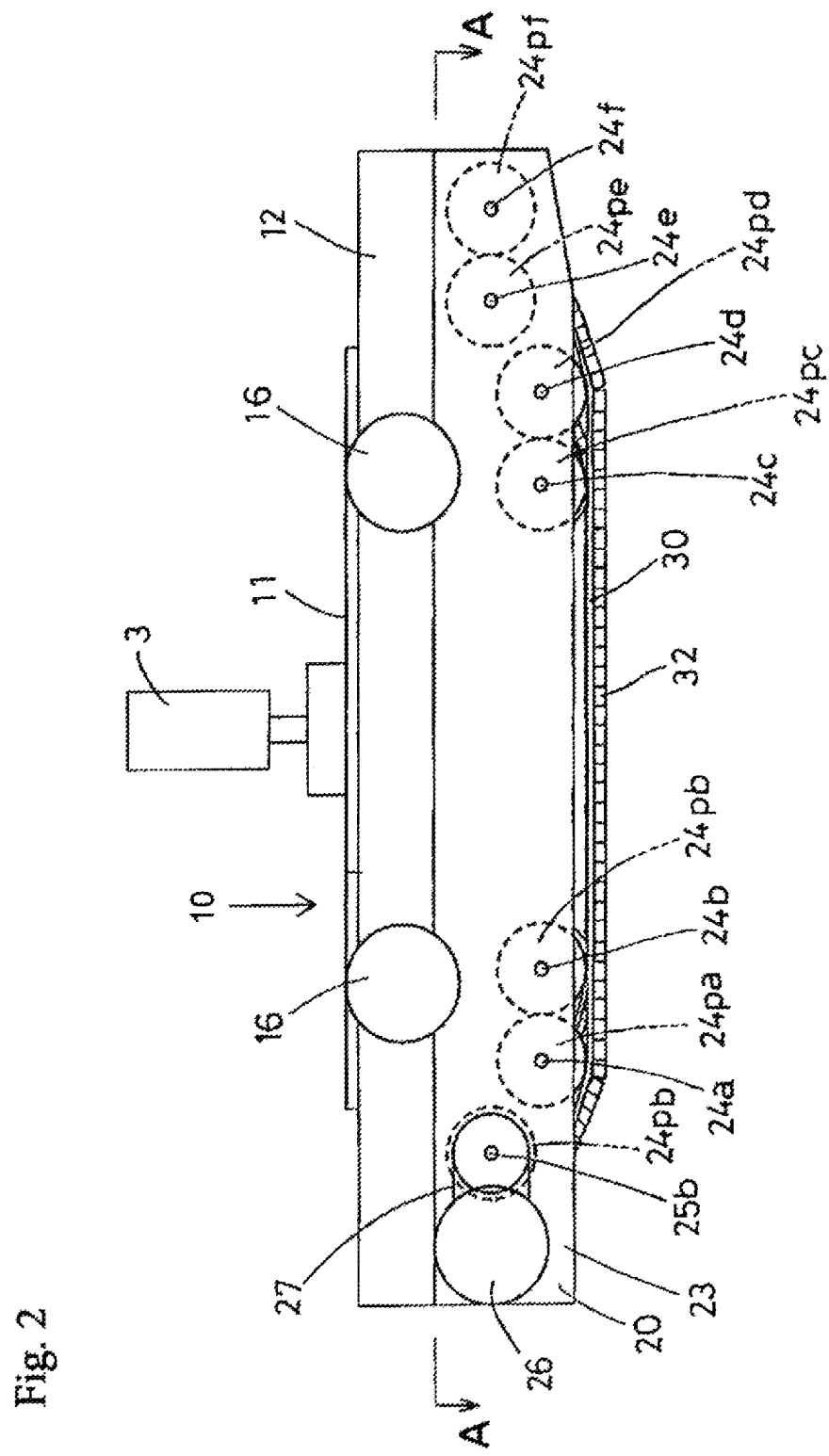
FIG. 2 is a front view of a transfer apparatus of the embodiment.
Figure 3:
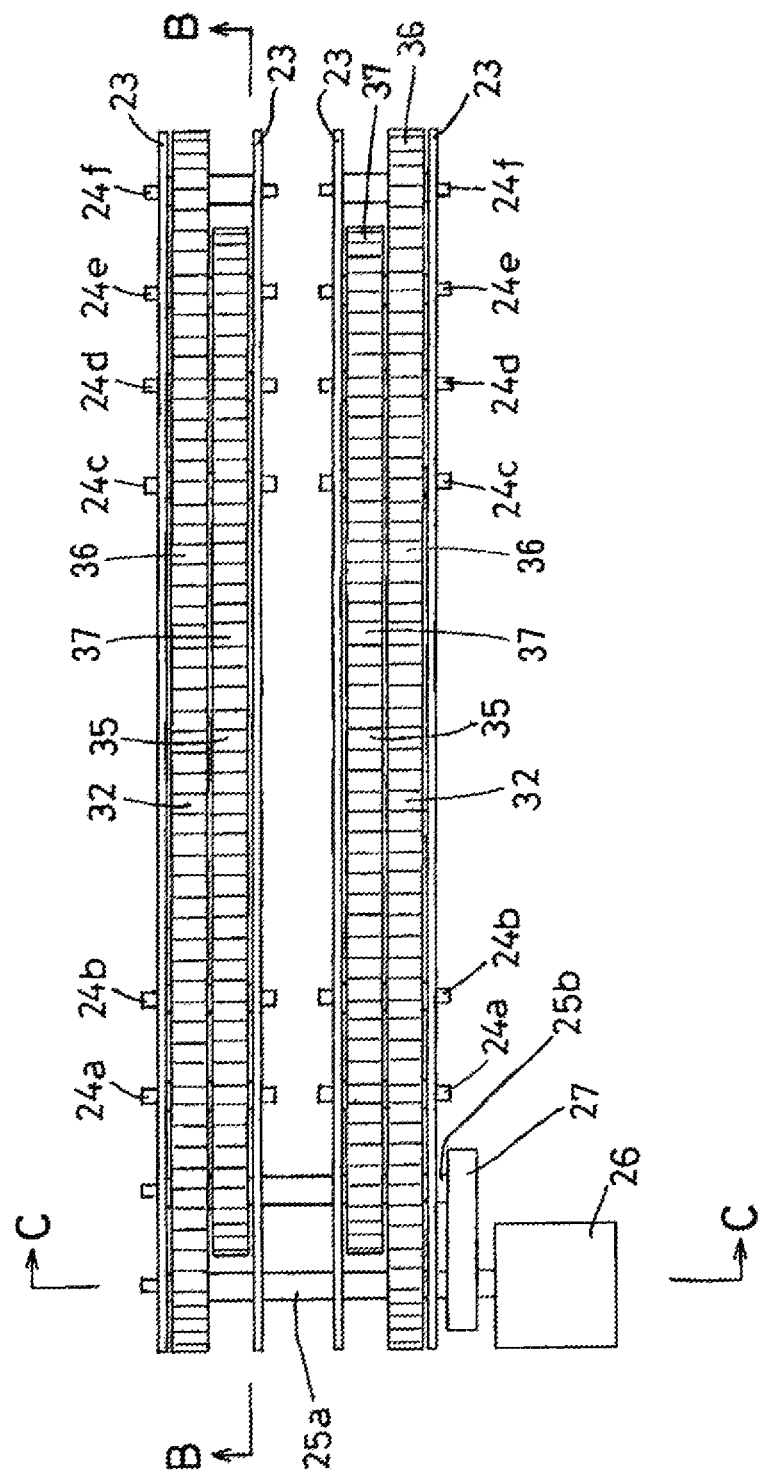
FIG. 3 is a cross-sectional view taken along the line A-A in FIG. 2.
Figure 4:
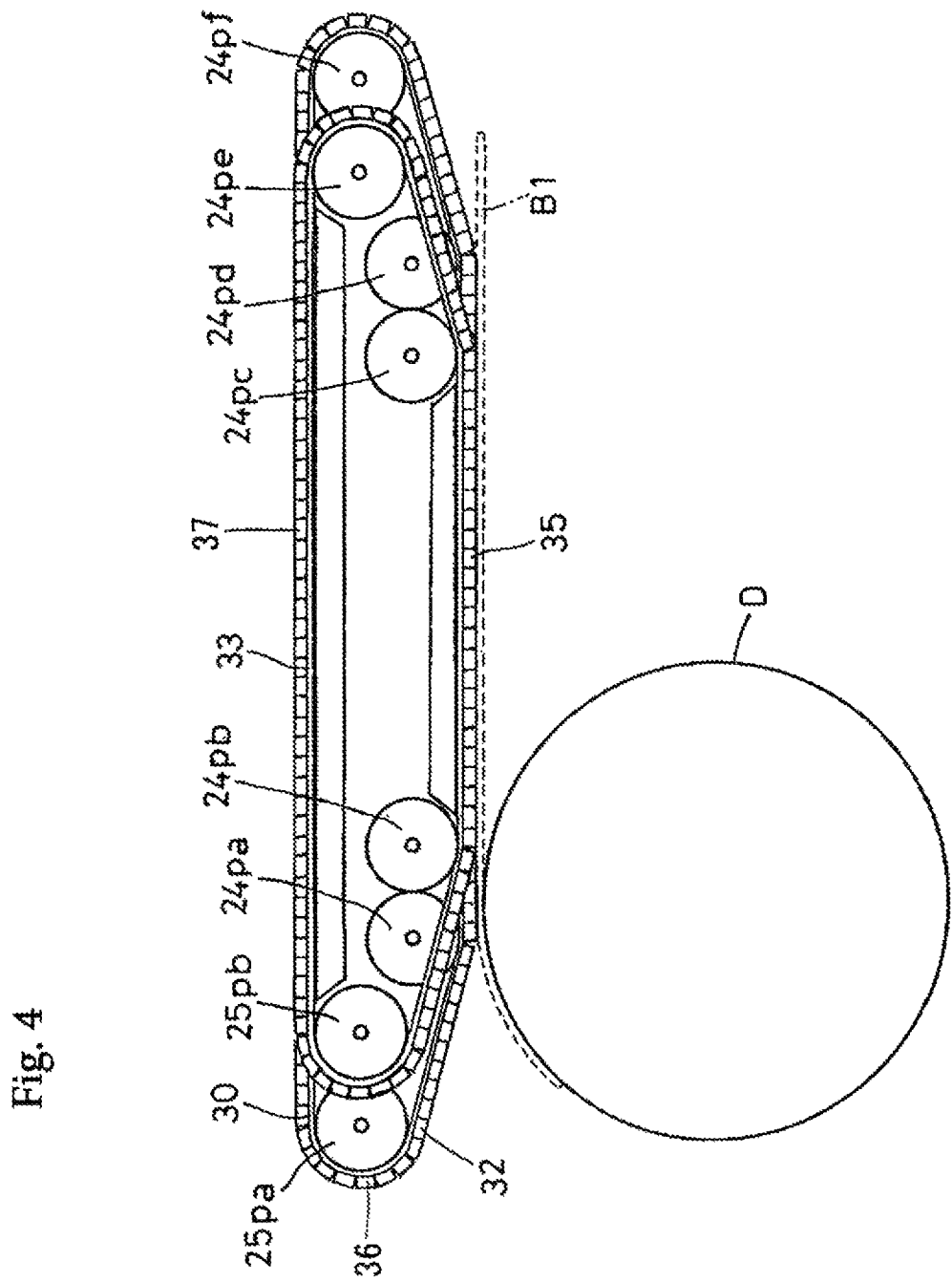
FIG. 4 is a cross-sectional view taken along the line B-B in FIG. 3.

As illustrated in FIG. 1 and FIGS. 6A to 6D, the transferring and adhering device 10 is provided above a front portion of the supply conveyor 5 and the mold drum D. As illustrated in FIG. 2, an upper surface 11 of the transferring and adhering device 10 is mounted on an elevating unit 3, which is mounted on a frame or the like, which is not illustrated. As the elevating unit 3, a ball screw mechanism rotated by, for example, a servo motor is employed. Accordingly, the transferring and adhering device 10 is configured to move upward and downward between and above the mold drum D and the supply conveyor 5.

Figure 5:
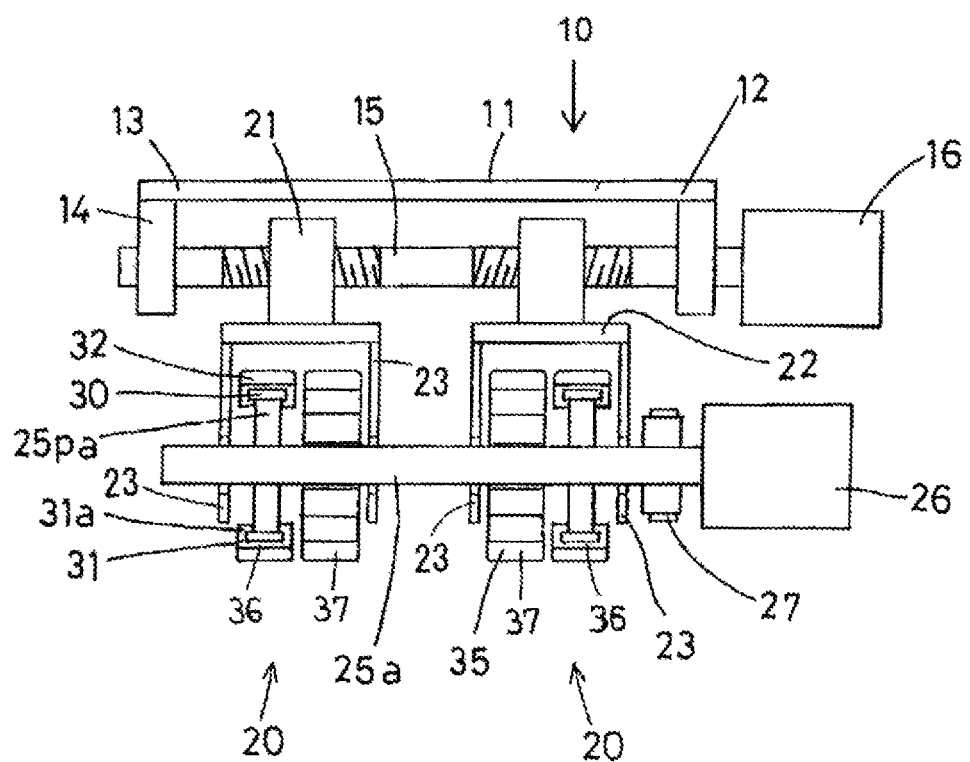
FIG. 5 is a cross-sectional view taken along the line C-C in FIG. 3.

As illustrated in FIG. 5, the transferring and adhering device 10 includes an upper mechanism 12 and two lower mechanisms 20 provided at left and right of a lower portion of the upper mechanism.

The upper mechanism 12 includes an upper plate 13 and side plates 14 provided so as to be suspended downward from both left and right ends of the upper plate 13. The upper plate 13 has a wider width than the belt material B1 in the left and right direction. Screw shafts 15 are provided so as to penetrate through the both left and right side plates 14 at two positions thereof in the fore-and-aft direction thereof. Since bearings are interposed between the screw shafts 15 and the side plates 14, the screw shafts 15 are free to rotate. Servo motors 16 are mounted at one of ends of the screw shafts 15. Accordingly, the screw shafts 15 are rotated. Left and right peripheral surfaces of the screw shafts 15 are formed with threads on the left and right in opposite directions. Screwing members 21 are screwed on left and right thread portions of each screw shaft 15. Therefore, the screwing members 21 move toward each other when the screw shaft 15 rotates in one direction, and the screwing members 21 move away from each other when the screw shaft 15 rotates in the opposite direction. The two front and rear servo motors 16 and 16 rotate the two front and rear screw shafts 15 and 15 simultaneously in the same direction. Accordingly, the distance between the two lower mechanisms 20 provided with the screwing members 21 are configured to be adjustable by the servo motors 16.

The lower mechanism 20 will be described with reference mainly to FIG. 2 to FIG. 5. Although there are two lower mechanisms 20 are provided, one of the two lower mechanisms 20 may be described as a representative for the sake of easy understanding. The lower mechanisms 20 each include the screwing member 21 screwed into the thread portion of the screw shaft 15, an upper plate 22 secured to a lower end of the screwing member 21, and side plates 23 suspending downward from both left and right ends of the upper plate 22. A transferring device 37 configured to transfer the belt material B1 from the supply conveyor 5 side to the mold drum D side and a separating unit 36 configured to separate the belt material B1 from the transferring device 37 is provided one by one between the left and right side plates 23 and 23. The separating unit 36 is arranged on the outer side of the transferring device 37 in the direction of the width of the belt material B1. The transferring device 37 and the separating unit 36 will be described below.

Between the left and right side plates 23 and 23, shafts 24a to 24f are provided from the front to the rear of the side plate 23 for each of the lower mechanisms 20. The shafts 24a to 24f are provided so as to be free to rotate with respect to the left and right side plates 23 and 23 via bearings. A drive shaft 25a is provided at a frontmost position of the side plate 23, and a driven shaft 25b is provided at a position rearward thereof so as to extend perpendicularly to the left and right side plates 23 and 23 and be free to rotate via bearings. The shaft 24a is positioned rearward of the driven shaft 25b. Pulleys 25pa, 25pb, and 24pa to 24pf are provided on the drive shaft 25a, the driven shaft 25b, and the shafts 24a to 24f between the left and right side plates 23 and 23, respectively. The diameters of the pulleys 25pa, 25pb, and 24pa to 24pf are all the same.

One end portion of the drive shaft 25a, for example, a right end portion thereof is mounted on the servo motor 26. Pulleys having the same diameters are provided on the drive shaft 25a and the driven shaft 25b at a position outside the side plate 23, for example, on the right side of the right side plate 23, respectively. These two pulleys are coupled with a belt 27. Accordingly, when the drive shaft 25a is rotated by the servo motor 26, a motive power of the drive shaft 25a is transmitted to the driven shaft 25b by the belt 27, and hence the driven shaft 25b rotates at the same angular speed as the drive shaft 25a. The drive shaft 25a and the driven shaft 25b extend across the two lower mechanisms 20. The drive shaft 25a and the driven shaft 25b are both spline shafts, and have a spline coupling structure between the pulleys 25pa and 25pb. Therefore, the distance between the two lower mechanisms 20 may be changed in a state in which the pulley 25pa is fitted to the drive shaft 25a and the pulley 25pb is fitted to the driven shaft 25b.

The separating unit 36 is provided with the pulleys 25pa, 24pa, 24pd, and 24pf, a first timing belt 30, a piece 31, and a pad 32. The pulleys are arranged in the order of 25pa, 24pa, 24pd, and 24pf from the front, and arranged so as to form a trapezoid having an upper base corresponding to a line connecting 25pa and 24pf and a lower base corresponding to a line connecting 24pa and 24pd when viewed from the left and right side. The line connecting 24pa and 24pd is shorter than the line connecting 25pa and 24pf. The first timing belt 30 is extended around the pulleys 25pa, 24pa, 24pd, and 24pf. The first timing belt 30 is provided with specific flat-plate pieces 31 mounted thereon so as to be arranged in a line in a direction of circulation of the first timing belt 30. The pieces 31 are each fixed to the first timing belt 30 with hook-like portions 31a provided on one side by clamping the first timing belt 30. Each piece 31 includes the pad 32 at a position on the side of an outer periphery of the first timing belt 30. The pad 32 is a urethane member having a square flat surface on the side of the outer periphery of the first timing belt 30.

As the servo motor 26 rotates in the normal direction, the pulley 25pa mounted on the drive shaft 25a rotates in the normal direction, and the pulleys 24pa, 24pd, and 24pf are rotated thereby, and the first timing belt 30 circulates. The pads 32 mounted on the first timing belt 30 circulate as follows. First of all, the pads 32 advance horizontally forward between a lowermost point of the pulley 24pd and a lowermost point of the pulley 24pa. Subsequently, the pads 32 advance obliquely forward and upward from the lowermost point of the pulley 24pa onward as a turning point. Subsequently, the direction of advancement of the pads 32 is changed at a position of the pulley 25pa, and advance rearward from then onward horizontally. Subsequently, the direction of advancement of the pads 32 is changed at a position of the pulley 24pf, and advance obliquely forward and downward from then onward. Subsequently, the direction of advancement of the pads 32 is changed at a position of the pulley 24pd, and advance forward again from then onward horizontally.

The transferring device 37 includes pulley 25pb, 24pb, 24pc, and 24pe, a second timing belt 33, a piece, and a magnet 35. The pulleys are arranged in the order of 25pb, 24pb, 24pc, and 24pe from the front, and arranged so as to form a trapezoid having an upper base corresponding to a line connecting 25pb and 24pe and a lower base corresponding to a line connecting 24pb and 24pc when viewed from the left and right direction. The line connecting 24pb and 24pc is shorter than the line connecting 25pb and 24pe. The second timing belt 33 is extended around the pulleys 25pb, 24pb, 24pc, and 24pe. The second timing belt 33 is also provided with the specific flat-plate pieces like the pieces 31 mounted thereon so as to be arranged in a line in a direction of circulation of the second timing belt 33. Then, the piece includes the magnet 35 mounted at a position on the side of the outer periphery of the second timing belt 33. The surface of the magnet 35 on the side of the outer periphery of the second timing belt 33 is a square flat surface.

When the drive shaft 25a rotates in the normal direction, the belt 27 circulates, and the driven shaft 25b rotates in the normal direction. Then, the pulleys 25pb, 24pb, 24pc, and 24pe are driven and the second timing belt 33 circulates. The magnets 35 mounted on the second timing belt 33 circulate as follows. First of all, the pads 32 advance horizontally forward between a lowermost point of the pulley 24pc and a lowermost point of the pulley 24pb. Subsequently, the pads 32 advance obliquely forward and upward from the lowermost point of the pulley 24pb onward as a turning point. Subsequently, the direction of advancement of the pads 32 is changed at a position of the pulley 25pb, and advance rearward from then onward horizontally. Subsequently, the direction of advancement of the pads 32 is changed at a position of the pulley 24pe, and advance obliquely forward and downward from then onward. Subsequently, the direction of advancement of the pads 32 is changed at a position of the pulley 24pc, and advance forward again from then onward horizontally. Since the angular speeds of the drive shaft 25a and the the driven shaft 25b are the same as described above, and the diameters of the pulleys 25pa and 25pb are the same, the first timing belt 30 and the second timing belt 33 circulate at the same speed. Therefore, the pads 32 and the magnets 35 circulate at the same speed.

Lower surfaces of the pads 32 between the pulleys 24pa and 24pd, and lower surfaces of the magnets 35 between the pulleys 24pb and 24pc are flush with each other. Therefore, the pads 32 and the magnets 35 both are capable of coming into abutment with the belt material B1 placed horizontally on the conveyor belt 50.

The pulleys are arranged in the order of 24pa, 24pb, 24pc, and 24pd from the front, and hence a row of the pads 32 hooked on the pulleys 24pa and 24pd via the first timing belt 30 is held horizontally over a longer distance in both forward and rearward than a row of the magnets 35 extending around the pulleys 24pb and 24pc via the second timing belt 33 in a surface in abutment with the belt material B1.

As regards this point, the front portion of the transferring and adhering device 10 will be described in detail as follows. In a state in which the transferring and adhering device 10 is moved downward for adhering the belt material B1, the lowermost point of the pulley 24pb is positioned above a highest point of the mold drum D or above a position rearward of the highest point thereof. Therefore, the magnets 35 advancing with the belt material B1 sticking thereto travel obliquely upward and forward from a position above a position upward of the highest point of the mold drum D or above a position rearward of the highest point thereof as a turning point. The lowermost point of the pulley 24pa is positioned forward of the turning point of the magnets 35, a position upward of the highest point of the mold drum D or above the position forward of the highest point of the mold drum D. Therefore, the pads 32 advance forward horizontally over a longer distance than the magnets 35. Specifically, at least at a position above the highest point of the mold drum D, the pads 32 are maintained horizontally.

(3) Method of Adhering Belt Material

Adhesion of the belt material B1 to the mold drum D by the belt material adhering apparatus having the configuration described above is achieved in the following manner.

The servo motors 16 are driven before starting adhesion of the belt material B1, and the distance between the left and right pads 32 and 32 is adjusted so that the left and right pads 32 and 32 come into abutment with the both left and right end portions of the belt material B1. As a result of adjustment, the left and right pads 32 and 32 are allowed to come into abutment with the both left and right end portions of the belt material B1 in a state in which part of the pads 32 and 32 protrude outward from the both left and right end portions of the belt material B1. At a position rather apart from the mold drum D and suitable for working, the belt material B1 is placed on the conveyor belt 50.

Figure 6:
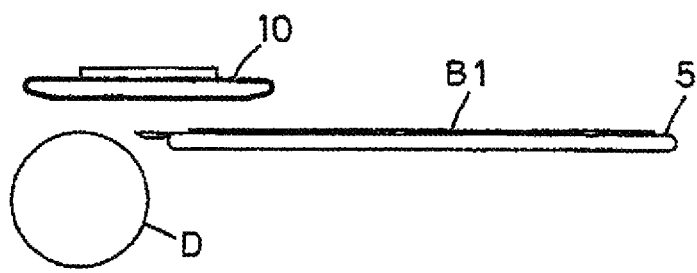
FIGS. 6A to 6D are schematic drawings illustrating an adhering method of the embodiment.
Figure 6:
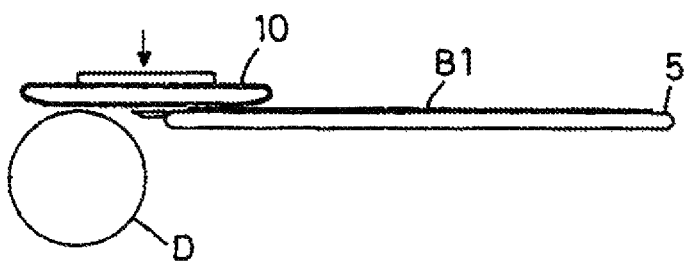
Figure 6:
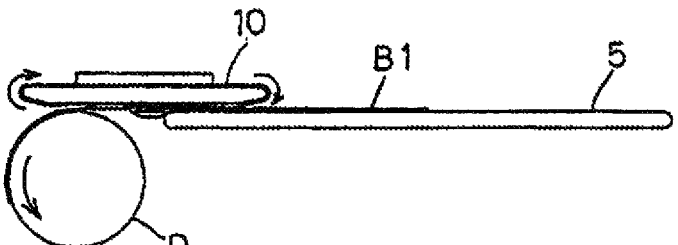
Figure 6:
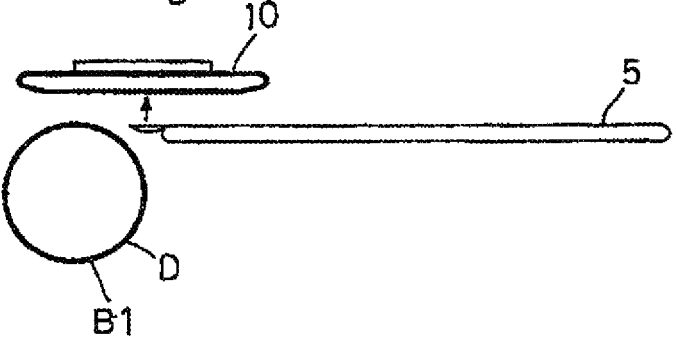

When a belt material adhering process is started, the supply conveyor 5 moves to a position opposing the mold drum D in a first step. At this time, the height of the upper surface of the conveyor belt 50 and the height of the highest point of the mold drum D match. At the substantially same time as this action, the transferring and adhering device 10 moves from a waiting position to a position above the front portion of the supply conveyor 5 and the mold drum D (FIG. 6A). At this time, the lowermost point of the pulley 24pb where the second timing belt 33 with the magnets 35 mounted thereon is wound is positioned above the highest point of the mold drum D or above a position rearward of the highest point of the mold drum D. The lowermost point of the pulley 24pa on which the first timing belt 30 with the pads 32 mounted is positioned forward of the lowermost point of the pulley 24pb and above the highest point of the mold drum D or above a position forward of the highest point of the mold drum D. Subsequently, the transferring and adhering device 10 is moved downward to a certain height (FIG. 6B). The certain height corresponds to a height where lower surfaces of the pads 32 and the magnets 35 abut against the belt material B1 fed between the mold drum D and the supply conveyor 5. At this time point, the distal end portion of the belt material B1 is sandwiched between the magnets 35 and the pads 32 of the transferring and adhering device 10 and the conveyor belt 50. The pads 32 each come into abutment with the both left and right end portions of the belt material B1 in a state of protruding slightly from the both left and right end portions of the belt material B1.

Subsequently, the conveyor belt 50 of the supply conveyor 5, the first timing belt 30, the second timing belt 33, and the mold drum D start rotating. At this time, the peripheral surfaces of the conveyor belt 50, the pads 32, the magnets 35, and the mold drum D rotate at the same speed.

When the conveyor belt 50 starts rotating, the belt material B1 placed thereon starts advancing toward the mold drum D. Then, the belt material B1 passes through the front end portion of the conveyor belt 50 from a portion in the distal end thereof. The belt material B1 advances toward the mold drum D in a state in which a portion of the belt material B1 having passed through the front end portion of the conveyor belt 50 is held by the magnets 35 from above. Then, the belt material B1 is separated from the magnet 35 on the mold drum D side, and is adhered onto the mold drum D (FIG. 6C).

Here, detailed modes of adhesion will be described. The modes of adhesion include three patterns.

First pattern is as follows. In this pattern, the lowermost point of the pulley 24pb is positioned above the highest point of the mold drum D. Therefore, the turning point where the magnets 35 circulate in the direction apart from the mold drum D is positioned above the highest point of the mold drum D. The lowermost point of the pulley 24pa is positioned above a position forward of the highest point of the mold drum D. Therefore, the pads 32 circulate forward to a position forward of the highest point of the mold drum D while being held horizontally.

When the magnets 35 and the pads 32 circulate in this manner, the belt material B1 is stuck on the magnets 35 and advances in a state of being in abutment with the pads 32 until coming into abutment with the highest point of the mold drum D. In the vicinity of the highest point of the mold drum D including the front and rear thereof, the belt material B1 assumes a state of being sandwiched between the magnets 35 and the pads 32 and the peripheral surface of the mold drum D. (The surface of the belt material B1 is formed of a rubber, and hence is deformed when coming into abutment with the mold drum D and the pads 32. Therefore, when the belt material B1 comes into abutment with the highest point of the mold drum D, the vicinity of the highest point at the highest point of the mold drum D and including the front and rear thereof assumes a state of being in abutment with the belt material B1. In the vicinity of the highest point of the mold drum D including the front and rear thereof, the belt material B1 assumes a state of being sandwiched between the peripheral surface of the mold drum D and the pad 32.) The magnets 35 circulate upward from the lowermost point of the pulley 24pb as a turning point. In contrast, the pads 32 continue to circulate forward horizontally to the lowermost point of the pulley 24pa. Therefore, the sandwiched portion of the belt material B1 described above is pushed by the pads 32 at a position forward of the highest point of the mold drum D, and is separated from the magnets 35 at the next moment. In the vicinity of the highest point of the mold drum D including the front and rear thereof, the pads 32 come into abutment with the belt material B1, and the belt material B1 comes into abutment with the peripheral surface of the mold drum D, whereby the belt material B1 is adhered to the peripheral surface of the mold drum D by the pads 32. Then, the belt material B1 is fixed to the peripheral surface of the mold drum D by a magnetic force.

The second pattern is as follows. In this pattern, the lowermost point of the pulley 24pb is positioned above a position rearward of the highest point of the mold drum D. Therefore, the turning point where the magnets 35 circulate in the direction apart from the mold drum D is positioned above the position rearward of the highest point of the mold drum D. The lowermost point of the pulley 24pa is positioned above the highest point of the mold drum D. Therefore, the pads 32 circulate forward to the highest point of the mold drum D while being held horizontally.

When the magnets 35 and the pads 32 circulate in this manner, the belt material B1 is stuck on the magnets 35 and advances horizontally in a state of being in abutment with the pads 32 until coming into abutment with the lowermost point of the pulley 24pb. The magnets 35 circulate upward from the lowermost point of the pulley 24pb as a turning point. In contrast, the pads 32 continue to circulate forward horizontally to the lowermost point of the pulley 24pa. Therefore, the pads 32 press the belt material B1 at a position forward of the lowermost point of the pulley 24pb and at a position rearward of the highest point of the mold drum D. Therefore, the belt material B1 is separated from the magnets 35 at a position forward of the lowermost point of the pulley 24pb and at a position rearward of the highest point of the mold drum D. Then, the belt material B1 advances in a state of being in contact with the pads 32 mainly by a friction between inertia and the pads 32. In the vicinity of the highest point of the mold drum D including the front and rear thereof, since the belt material B1 assumes a state of being sandwiched between the pads 32 and the peripheral surface of the mold drum D, the belt material B1 is adhered to the peripheral surface of the mold drum D by the pads 32. Then, the belt material B1 is fixed to the peripheral surface of the mold drum D by the magnetic force.

The third pattern is as follows. In this pattern, the lowermost point of the pulley 24*pb* is positioned above a position rearward of the highest point of the mold drum D. Therefore, the turning point where the magnets 35 circulate in the direction apart from the mold drum D is positioned above the position rearward of the highest point of the mold drum D. The lowermost point of the pulley 24*pa* is positioned above a position forward of the highest point of the mold drum D. Therefore, the pads 32 circulate forward to a position forward of the highest point of the mold drum D while being held horizontally.

When the magnets 35 and the pads 32 circulate in this manner, the belt material B1 is stuck on the magnets 35 and advances horizontally in a state of being in abutment with the pads 32 until coming into abutment with the lowermost point of the pulley 24*pb*. The magnets 35 circulate upward from the lowermost point of the pulley 24*pb* as a turning point. In contrast, the pads 32 continue to circulate forward horizontally to the lowermost point of the pulley 24*pa*. Therefore, the pads 32 press the belt material B1 at a position forward of the lowermost point of the pulley 24*pb* and at a position rearward of the highest point of the mold drum D. Therefore, the belt material B1 is separated from the magnets 35 at a position forward of the lowermost point of the pulley 24*pb* and at a position rearward of the highest point of the mold drum D. Then, the belt material B1 advances in a state of being in contact with the pads 32 mainly by the friction between inertia and the pads 32. In the vicinity of the highest point of the mold drum D including the front and rear thereof, since the belt material B1 assumes a state of being sandwiched between the pads 32 and the peripheral surface of the mold drum D, the belt material B1 is adhered to the peripheral surface of the mold drum D by the pads 32. Then, the belt material B1 is fixed to the peripheral surface of the mold drum D by the magnetic force.

When the belt material B1 is adhered to the peripheral surface of the mold drum D, the pads 32 come into abutment with the both left and right end portions of the belt material B1 in a state of slightly protruding from the both left and right end portions of the belt material B1.

In the manner as described above, the belt material B1 is separated from the magnets 35 gradually from the distal end thereof and is adhered to the peripheral surface of the mold drum D. Then, when the mold drum D rotates once, the rear end of the belt material B1 is adhered to the peripheral surface of the mold drum D. At this time, the distal end and the rear end of the belt material B1 match on the peripheral surface of the mold drum D.

When adhesion of the belt material B1 to the peripheral surface of the mold drum D is terminated, rotations of the conveyor belt 50, the first timing belt 30, the second timing belt 33, and the mold drum D are stopped. Subsequently, the transferring and adhering device 10 moves upward (FIG. 6D). Subsequently, the supply conveyor 5 and the transferring and adhering device 10 return back to the original positions before the start of the belt material adhering process. Accordingly, the belt material adhering process is terminated.

When the actions as described above are terminated, the mold drum D moves on the track 2 and transports the belt material B1 adhered to the mold drum D to the next process. Alternatively, after the actions described above has terminated, a second belt material B1 is adhered on the belt material B1 adhered to the mold drum D by the same apparatus.

(4) Effect

According to the apparatus and the method of adhering the belt material B1 described thus far, waste of time at the time of transferring the belt material B1 on the supply conveyor to the mold drum and adhere the same thereto may be reduced. More specifically, according to the apparatus and the method of adhering the belt material B1 described thus far, the transferring device 37 of the transferring and adhering device 10 circulates without stopping in the mid-course and transfers the belt material B1 from the supply conveyor 5 to the mold drum D. Therefore, waste of time at the time of transferring the belt material B1 on the supply conveyor to the mold drum D and adhere the same thereto may be eliminated.

Since the belt material B1 cannot be re-held in the course of the transferring and adhering processes, non-uniformity of the tension can hardly occur on the belt material B1 adhered to the mold drum D. Therefore, uniformity of the completed tires as products is improved.

Since the apparatus of adhering the belt material B1 described thus far has the separating unit 36, the belt material B1 can be separated reliably from the transferring and adhering device 10 on the mold drum D. In particular, since the magnets 35 circulate in the direction of separating from the mold drum D (obliquely forward and upward) at the highest point of the mold drum D or the position rearward of the highest point of the mold drum D as a turning point, and simultaneously, the pads 32 circulate forward horizontally from the turning point, whereby the belt material B1 can be separated reliably from the magnets 35 by the pads 32.

When the pads 32 come into abutment with the belt material B1 above the highest point of the mold drum D and the belt material B1 is sandwiched between the highest point of the mold drum D and the pads 32, the belt material B1 can be adhered to the peripheral surface of the mold drum D without positional displacement or the like.

Since the pads 32 circulate rearward for a longer distance than the magnets 35, the pads 32 can be brought into abutment with the belt material B1 before being stuck to the magnets 35. Therefore, the upward and downward movement of the belt material B1 before being adhered to the magnet 35 is restrained. Therefore, positional displacement or the like of the belt material B1 in the states in which the belt material B1 is stuck to the magnet 35 and in which the belt material B1 is stuck to the mold drum D is prevented.

In the apparatus of adhering the belt material B1 described thus far, since the belt material B1 is stuck directly to the magnets 35, a sticking force is strong and, in addition, since the magnets 35 also move together with the belt material B1, the belt material B1 is transferred toward the mold drum D in a state of being held constantly. Therefore, the belt material B1 can hardly move tortuously or come into out of alignment from the original position on the mold drum D. Different from the apparatus disclosed in JP-A-2001-

079954, the magnets 35 mounted on the second timing belt 33 also move together with the belt material B1, and hence the circulation of the second timing belt 33 is not impaired by the sticking force of the magnets 35. Therefore, the torque for circulating the second timing belt 33 may be small, and the smooth circulation is achieved.

In the apparatus of adhering the belt material B1 described above, the separating unit 36 includes a number of divided pads 32 arranged in the circulating direction of the first timing belt 30. Therefore, when one of the pads 32 is broken, only the broken pad 32 can be replaced without replacing the entire separating unit 36. Since a space is formed between the pads 32, the area of tight contact between the belt material B1 and the separating unit 36 is reduced in comparison with a case where the member having no spaces on the surface is brought into abutment with the belt material B1. Therefore, even when the belt material B1 is adhesive, a probability that the belt material B1 is stuck to the separating unit 36 and cannot be separated is avoided.

In the apparatus of adhering the belt material B1 described above, the transferring device 37 includes a number of divided magnets 35 arranged in the circulating direction of the second timing belt 33. Therefore, when one of the magnets 35 is broken, only the broken magnet 35 can be replaced without replacing the entire transferring device 37.

In the apparatus of adhering the belt material B1 described above, since the transferring device 37 is provided so as to come into abutment with two left and right positions of the belt material B1, the belt material B1 can be transferred in a state of being tensed in the left and right direction. Furthermore, since the separating unit 36 is provided so as to come into abutment with the two left and right positions of the belt material B1, the belt material B1 can be separated easily from the magnet 35. Here, the separating unit 36 is provided outside of the transferring device 37 in the direction of the width of the belt material B1 (the direction orthogonal to the direction of feeding the belt material B1), and comes into abutment with the both ends of the belt material B1 in the width direction thereof. Therefore, the separating unit 36 presses the both ends of the belt material B1 in the widthwise direction thereof against the peripheral surface of the mold drum D. Therefore, the belt material B1 is adhered onto the peripheral surface of the mold drum D without being displaced in position to the both ends in the width direction thereof. Since the distance between the sets of the separating unit 36 and the transferring device 37 (the lower mechanisms 20) in the direction of the width of the belt material B1 can be adjusted, various sizes of the belt materials B1 can be transferred and adhered to the mold drum D by using the apparatus described above.

In the apparatus and method of adhering the belt material B1 described above, since the peripheral surfaces of the conveyor belt 50, the pads 32, the magnets 35, and the mold drum D rotate at the same speed, the belt material B1 is smoothly transferred and adhered to the mold drum D. A probability of waving of the belt material B1 on the mold drum D or during the transfer process is eliminated. Therefore, the belt material B1 is adhered to the mold drum D at a uniform tension without moving tortuously or being displaced from the original position. Consequently, the uniformity of the tires as products is improved.

(5) Example

Time required for adhering the belt material B1 to the mold drum D was inspected by using the apparatus described above. Here, the time required for adhering the belt material B1 to the mold drum D means time from the start to the end of the above-described belt material adhering process. As an index of the tortuous movement or positional displacement in the state of being adhered (displacement from its proper position), an amount of off-center (which corresponds to summation of rightward displacement and leftward displacement of a center line of the belt material B1 adhered to the peripheral surface of the mold drum D with respect to a center line of the peripheral surface of the mold drum D) and tip displacement (which corresponds to the leftward and rightward displacement of the distal end and the rear end of the belt material B1 adhered to the peripheral surface of the mold drum D) was inspected. As a comparative example, the same items were inspected by using the apparatus disclosed in the embodiment of the Japanese Patent No. 4,499,803. The result is shown in Table 1. Numerical values of the example in Table 1 indicate ratio of the time and the amount described above in the case where the numerical values of the comparative example are determined to 100. The smaller values are better.

TABLE 1

|  | Example | Comparative Example |
|---|---|---|
| time required for adhesion | 41 | 100 |
| off center | 50 | 100 |
| tip displacement | 67 | 100 |

As understood from the Table 1, the time required for adhering the belt material B1 to the mold drum D of the example was 41% of the comparative example, and was found to have been reduced significantly by using the apparatus and the method of the present application of the invention. The off-center was 50% of the related art, and the tip displacement was 67% of the related art. Therefore, the fact that the tortuous movement and the positional displacement of the belt material could be reduced by using the apparatus and the method of the present application of the invention was confirmed.

(6) Modification

In the embodiment described above, the object to be adhered to the mold drum was the belt material B1. However, belt-shaped tire members other than the belt material may be adhered to the mold drum by using the apparatus described above. In particular, the apparatus described above may be used as-is as long as the belt-shaped tire member to be adhered to the mold drum is the belt-shaped tire member having cords to be stuck to the magnets such as the steel cords embedded in the rubber material.

When the belt-shaped tire member to be adhered to the mold drum is not stuck to the magnet, the belt-shaped tire member is not stuck to the magnet 35, and hence the belt-shaped tire member cannot be transferred by using the apparatus described above as-is. However, by mounting another sticking device on the second timing belt 33 instead of the magnets 35, the belt-shaped tire member can be transferred. Examples of another sticking device include an adhesive disk or a sucking device.

It is also possible to employ another endless track instead of the first timing belt 30 or the second timing belt 33 in the embodiment described above. Examples of other endless track include a chain. However, a timing belt is preferable in terms of the characteristic of not being expanded in association with the usage.

It is also possible to use the endless track which comes into direct abutment on the surface on the outer peripheral side with the belt-shaped tire member instead of the first timing belt 30. In this case, it is not necessary to mount the pads 32 on the endless track.

It is also possible to use the endless track which can stick to the belt-shaped tire member by itself instead of the second timing belt 33. Examples of the endless track include an endless track formed of magnet by itself or an endless track having adhesive on the surface thereof. When the endless track is used, it is not necessary to mount another sticking device on the endless track.

In the embodiment described above, the separating unit is disposed outside the transferring device in the direction of the width of the belt material B1. However, the arrangement of the separating unit and the transferring device may be vice versa.

In the embodiment described above, one each of the separating unit and the transferring device are provided on both sides in the direction of the width of the belt material B1. However, the number of the separating unit and the transferring device is not limited thereto. The number of the separating unit and the transferring device may be changed in accordance with the size or the weight of the belt-shaped tire member to be transferred. For example, when the width of the belt material B1 is wide, at least one separating unit and at least one transferring device constitute a set, and three or more of such sets may be provided in the direction of the width of the belt material B1. The number of the separating units and the number of the transferring devices need not to be the same.

As the separating unit configured to separate the belt-shaped tire member from the transferring device, various types of units are conceivable in addition to the separating unit 36 of the embodiment described above. For example, a plate-shaped member which is provided above the mold drum and configured to separate the transferring device and the belt-shaped tire member by a distal end thereof entering between the transferring device and the belt-shaped tire member fed by being stuck thereto is also applicable. In this case, the belt-shaped tire member separated from the transferring device is adhered to the mold drum by being pressed against the mold drum by a surface of the plate-shaped member on the side of the mold drum.

However, as long as the separating unit is a member circulating in the same direction as the direction of circulation of the transferring device in abutment with the belt-shaped tire member forward of the turning point where the circulation of the separating unit changes to the direction separating from the mold drum, above the highest point of the mold drum, or above the position forward of the highest point of the mold drum, the transferring device and the belt-shaped tire member can be separated easily, which is preferable. Examples of the separating unit as described above include a disc provided above the mold drum and configured to rotate in the direction parallel to the direction of circulation of the transferring device. The disc is provided so that the lowermost point thereof is positioned above the highest point of the mold drum or above the position of the position forward of the highest point of the mold drum above the position forward of the turning point of the transferring device, and is configured to separate the belt-shaped tire member from the transferring device by pressing the belt-shaped tire member about to move obliquely upward in a state of being stuck to the transferring device downward by the lowermost point thereof. If the speed of the circulation of the separating unit as described above is the same as the speed of circulation of the transferring device, the belt-shaped tire member and the separating unit do not graze with the separating unit, which is preferable.

A configuration in which a second disc is provided so that the lowermost point thereof is positioned above the highest point of the mold drum is also possible in the case where the disc is provided so that the lowermost point thereof is positioned above the position forward of the highest point of the mold drum. Then, the second disc is brought into abutment with the belt material B1, whereby the belt material B1 is provided so as to adhere to the peripheral surface of the mold drum.

In the embodiment described above, the supply conveyor 5 is used as the feeding device of the belt material B1. However, the feeding device of the belt-shaped tire member such as the belt material B1 is not limited thereto. The feeding device may be of any type as long as the belt material B1 can be supplied toward the mold drum.

In the embodiment described above, the mold drum D has the magnets and the belt material B1 is fixed to the peripheral surface thereof by the magnetic force. However, the mold drum does not have to have the magnets. However, in order to fix the belt material B1 on the peripheral surface of the mold drum stably, the mold drum is preferably provided with a certain device for fixing the belt material B1. For example, a configuration in which a plurality of holes are formed on the peripheral surface of the mold drum, and a device for sucking inward of the mold drum is provided, and the belt material B1 is fixed to the peripheral surface of the mold drum by sucking from the holes is also applicable.

What is claimed is:

1. A method of adhering a belt-shaped tire member by transferring the belt-shaped tire member from a feeding device configured to feed the belt-shaped tire member arranged at a position opposing a mold drum onto the mold drum comprising:

using a transferring and adhering device including a transferring device configured to be capable of sticking to the belt-shaped tire member and circulate between the feeding device side and the mold drum side, and a separating unit configured to separate the belt-shaped tire member from the transferring device on the mold drum side; and circulating the transferring device in accordance with a feeding action of the feeding device;

transferring the belt-shaped tire member stuck to the transferring device from the feeding device side to the mold drum side, and separating the belt-shaped tire member from the transferring device by the separating unit and adhering the same onto the mold drum, wherein the transferring device and the separating unit are different components, wherein the separating unit is a member configured to circulate in parallel to the transferring device, the transferring device is provided so as to circulate away from the mold drum at a position rearward of the highest point of the mold drum in a direction of advancement of the belt-shaped tire member as a turning point, and simultaneously, the belt-shaped tire member is separated from the transferring device by bringing the separating unit into abutment with the belt-shaped tire member at a position forward of the turning point in the direction of advancement of the belt-shaped tire member, and the separating unit is brought into abutment with the belt-shaped tire member at a position above the highest point of the mold drum to sandwich the belt-shaped tire member between the separating unit and the highest point of the mold drum, thereby adhering the belt-shaped tire member onto the mold drum.

2. The method of adhering the belt-shaped tire member according to claim 1, wherein the feeding device includes a conveyor on which the belt-shaped tire member is placed, and the conveyor is configured to circulate in a direction of feeding of the belt-shaped tire member at the same speed as the transferring device.

3. The method of adhering the belt-shaped tire member according to claim 1, wherein the belt-shaped tire member is a member having a steel cord embedded in a rubber material, and sticks to the transferring device by a magnetic force.

4. A method of adhering a belt-shaped tire member by transferring the belt-shaped tire member from a feeding device configured to feed the belt-shaped tire member arranged at a position opposing a mold drum onto the mold drum comprising:
   using a transferring and adhering device including a transferring device configured to be capable of sticking to the belt-shaped tire member and circulate between the feeding device side and the mold drum side, and a separating unit configured to separate the belt-shaped tire member from the transferring device on the mold drum side; and
   circulating the transferring device in accordance with a feeding action of the feeding device;
   transferring the belt-shaped tire member stuck to the transferring device from the feeding device side to the mold drum side, and
   separating the belt-shaped tire member from the transferring device by the separating unit and adhering the same onto the mold drum,
   wherein the transferring device and the separating unit are different components,
   wherein the separating unit is a member configured to circulate in parallel to the transferring device,
   the transferring device is provided so as to circulate away from the mold drum at a highest point of the mold drum in a direction of advancement of the belt-shaped tire member as a turning point, and simultaneously,
   the belt-shaped tire member is separated from the transferring device by bringing the separating unit into abutment with the belt-shaped tire member at a position forward of the turning point in the direction of advancement of the belt-shaped tire member, and
   the separating unit is brought into abutment with the belt-shaped tire member at a position above the highest point of the mold drum to sandwich the belt-shaped tire member between the separating unit and the highest point of the mold drum, thereby adhering the belt-shaped tire member onto the mold drum.

* * * * *